United States Patent [19]

Daniels

[11] Patent Number: 4,560,316
[45] Date of Patent: Dec. 24, 1985

[54] BOAT AND MOTOR VEHICLE TRAILER

[76] Inventor: Lewis D. Daniels, E. 14 - 6th, Spokane, Wash. 99204

[21] Appl. No.: 585,001

[22] Filed: Mar. 1, 1984

[51] Int. Cl.⁴ .............................................. B60P 3/06
[52] U.S. Cl. ................................ 414/481; 280/414.1; 410/2; 414/494; 414/529
[58] Field of Search ........ 414/481, 494, 529, 532–534, 414/559; 280/80 B, 414.1; 410/2–4, 24, 26

[56] References Cited

U.S. PATENT DOCUMENTS

| | | |
|---|---|---|
| 2,585,664 | 9/1947 | Le May et al. |
| 3,155,249 | 11/1964 | Johnson |
| 3,292,802 | 6/1963 | Hutchinson |
| 3,649,064 | 3/1972 | Bledsoe |
| 3,677,425 | 7/1972 | Patten |
| 3,822,899 | 7/1974 | Slack |
| 4,068,772 | 1/1978 | Prudhomme |
| 4,221,410 | 9/1980 | Vencill et al. |
| 4,273,347 | 6/1981 | Hulse ................... 280/80 B |
| 4,278,375 | 7/1981 | Drake et al. ............ 410/26 |

*Primary Examiner*—Robert G. Sheridan
*Attorney, Agent, or Firm*—Wells, St. John & Roberts

[57] ABSTRACT

Disclosed is a trailer for simultaneously carrying a wheeled motor vehicle and a boat. The trailer uses vehicle ramps mounted forward of the trailer wheels to provide a platform upon which the motor vehicle is carried. An inclined hull supporting structure is mounted at the rear portion of the trailer so that the boat can be carried with the bow positioned above the motor vehicle. The trailer has a frame which is slidably adjustable upon a wheel carriage to allow shifting the load for varying load conditions. The trailer is constructed to allow loading and launching of the boat independent of whether a motor vehicle is thereon.

9 Claims, 7 Drawing Figures

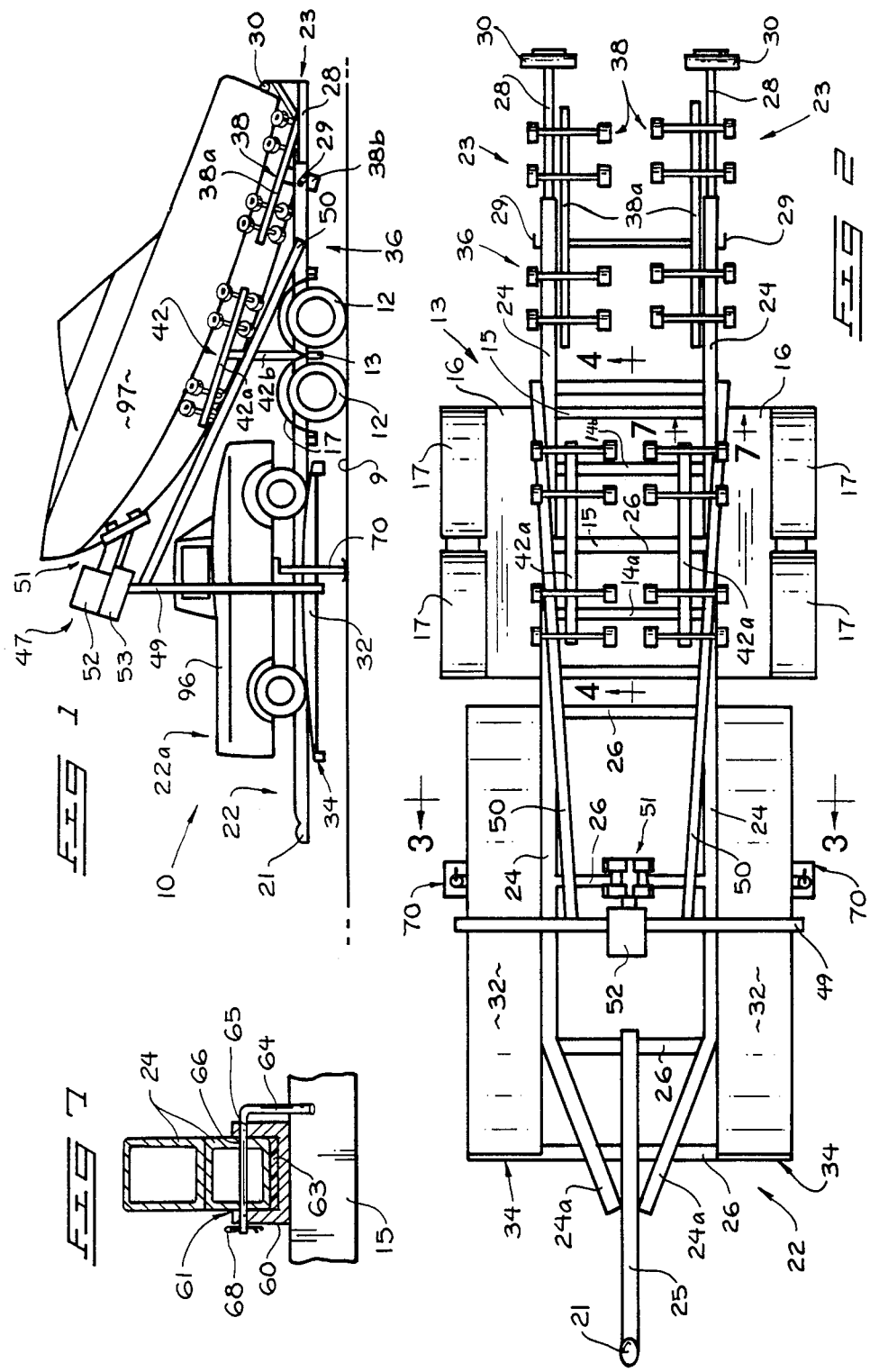

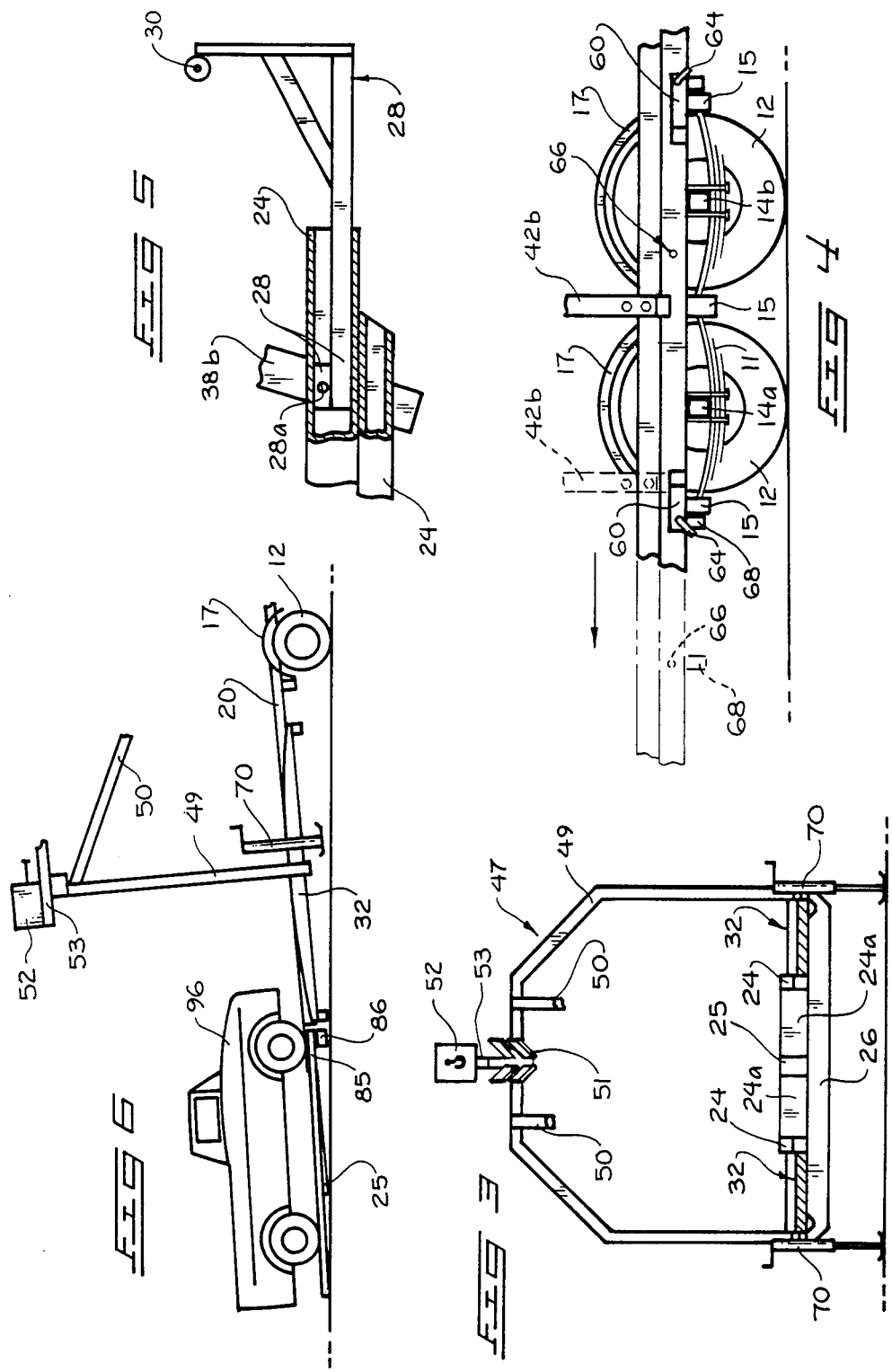

BOAT AND MOTOR VEHICLE TRAILER

TECHNICAL FIELD

The technical field of this invention is trailers for carrying boats and automobiles.

BACKGROUND OF THE INVENTION

The prior art generally includes trailers designed to carry multiple boats or multiple motor vehicles behind large commercial vehicles.

Also in the prior art are some trailers for simultaneously carrying boats and motor vehicles. U.S. Pat. No. 4,068,722 to Prudhomme discloses a dual load trailer designed to carry a motor vehicle on the lower part of the trailer, with a watercraft attached to a separate boat trailer which is loaded on a collapsible frame above the motor vehicle. Since the boat is positioned completely above the motor vehicle, the center of gravity of the loaded trailer is high, thereby reducing the stability of the trailer. The Prudhomme trailer also does not allow the boat to be unloaded until the motor vehicle has been unloaded.

U.S. Pat. No. 4,221,410 to Vencill et al discloses another trailer designed to carry a motor vehicle below with a boat mounted above on a collapsible frame. This design has the same center of gravity problem as Prudhomme. The boat also cannot be unloaded until the motor vehicle has been unloaded.

The present trailer includes an inclined boat carrying means, on the rear portion of the trailer and a set of vehicle ramps on the forward portion of the trailer for hauling a wheeled motor vehicle. The bow of the boat is elevated to allow a portion of the motor vehicle to fit under the bow of the boat, thus reducing the overall length of the trailer and lowering the center of gravity. The current invention also allows a boat to be loaded and unloaded with the motor vehicle in place on the trailer.

Other advantages of the invention will be apparent from the detailed description given herein.

DESCRIPTION OF THE DRAWINGS

A preferred embodiment of this invention is illustrated in the accompanying drawings, in which:

FIG. 1 is a side elevational view of a trailer according to this invention showing a motor vehicle and boat in place thereon;

FIG. 2 is a top view of the trailer shown in FIG. 1 without the motor vehicle or boat;

FIG. 3 is a cross-sectional view of the trailer taken along line 3—3 of FIG. 2;

FIG. 4 is a partial cross-sectional view of the trailer taken along line 4—4 of FIG. 2;

FIG. 5 is an enlarged partial side elevational view showing a rear support bracket and its connection with the trailer frame; portions are broken away and shown in cross-section;

FIG. 6 is a partial side elevational view of the front portion of the trailer with parts broken away and removed for clarity; and FIG. 7 is a cross-sectional view taken along line 7—7 of FIG. 2.

DESCRIPTION OF THE PREFERRED EMBODIMENT

In compliance with the constitutional purpose of the Patent Laws "to promote the progress of science and useful arts" (Article 1, Section 8), applicant submits the following disclosure of the invention.

FIG. 1 shows a preferred embodiment of the dual load trailer of this invention. The dual load trailer 10 includes a plurality of wheel means 12 which are rotatably mounted on a wheel carriage 13. The wheel means are resting on a supporting surface 9 such as a roadway. Wheel carriage 13 includes front axle 14a and rear axle 14b. Axles 14a and b are connected by a suspension system such as leaf springs 11 to wheel carriage framework 15. Running boards 16 are advantageously mounted atop the wheel carriage framework at each side to allow a man to stand thereon during launching and loading of boats such as boat 97 or of motor vehicles such as vehicle 96. Fenders 17 are also preferably mounted on the wheel carriage to prevent splash from wheels 12.

Trailer 10 has a trailer frame 20 having a front end 22 and a rear end 23. A hitch means 21 is connected to the trailer frame 20 at the front end to allow the trailer to be pulled.

FIG. 2 shows that trailer frame 20 includes at least two longitudinal side rails 24 which extend from near the front end to near the rear end of the trailer frame. A plurality of cross members 26 extend across the trailer frame and connect longitudinal side rails 24 in fixed relationship. The side rails 24 are substantially parallel in the preferred embodiment to facilitate sliding adjustment of the trailer frame 20 relative to the wheel carriage 13 as will be more fully explained below. Side rails 24 also preferably include inwardly angled front pieces 24a to provide lateral stability to trailer tongue 25. Trailer tongue 25 is rigidly connected at the front end of the trailer frame using cross members 26 and angled front pieces 24a of side rails 24.

FIGS. 2 and 5 show that trailer frame 20 also includes a pair of rear support brackets 28 which can advantageously be mounted to the remainder of the trailer frame by slidably inserting them into the rear end of side rails 24. The rear support brackets are locked in place using locking pins 29 which fit into holes 28a. Also shown are a pair of rollers 30 mounted at the top of rear support brackets 28. Rollers 30 engage and support the transom of boat 97 when the boat is in place on the trailer.

Vehicle ramps 32 are provided on the forward portion 22a of trailer frame 20, to provide platforms for transporting a wheeled motor vehicle 96 thereon. The vehicle ramps are connected to trailer frame 20 and supported thereby using cross members 26 and side rails 24. The ramp front edges 34 extend below the bottom of the side rails 24, to facilitate loading four wheel motor vehicle 96.

An inclined hull supporting means 36 is mounted upon trailer frame 20 to support a boat 97 thereon. The inclined hull supporting means includes rear roller assemblies 38 and front roller assemblies 42. Front and rear roller assemblies 42 and 38 are preferably constructed to allow the front and rear assembly beams 42a and 38a to pivot so as to automatically adjust to the boat hull as it is launched or replaced onto the hull supporting means. Such pivotal roller assemblies are well known in the art of boat trailer manufacture.

Rear roller assemblies 38 are attached to the side rails 24 using brackets 38b. Front roller assemblies 42 are attached to the side rails 24 using brackets 42b. Brackets 38b and 42b are rigidly but adjustably mounted on side rails 24. Front brackets 42b are preferably adjustable between two or more positions along side rails 24. Brackets 38b and 42b are also preferably adjustable in height for varying sizes of boats.

The hull supporting means 36 also includes a forward hull support assembly 47. Forward hull support assembly 47 includes a transverse span member 49 which extends up from connection with trailer frame 20 and over four wheel vehicle 96 (See FIG. 3). Transverse span member 49 is adjustable to different positions along trailer frame 20. Span member 49 is stabilized against forward or rearward sway by two lateral members 50 which extend backwardly therefrom and connect to side rails 24. Lateral members 50 are adjustably connected to transverse span member 49 to accommodate different sized boats and motor vehicles. Later members 50 can also advantageously be used to stabilize front roller assembly support brackets 42b by providing adjustable connection therebetween (see FIGS. 1 and 2).

The forward hull support assembly also preferably includes a V-shaped bow support 51 which is adjustably mounted upon tranverse span member 49. A winch means 52 is also advantageously included to pull the boat onto the inclined hull support means 36. Bow support 51 and winch means 52 are preferably connected to the transverse span member 49 using mounting block 53. The positions of both thereon are adjustable for various sizes and shapes of hulls.

The trailer frame 20 is longitudinally adjustable with respect to the wheel carriage 13 using a trailer frame position adjustment means. Adjustment between these two major parts of the trailer allow it to convert for carrying both the boat and wheeled vehicle or to carry only the boat or motor vehicle. The longitudinal adjustment is needed to compensate for the shift in the center of gravity of the trailer load and its resultant effect on the tongue weight of the trailer.

Adjustment between the wheel carriage and trailer frame is accomplished using side rails 24 which are spaced apart and approximately parallel over the pertinent range. The side rails 24 detachably connect to wheel carriage framework 15 using guide channel pieces 60 (see FIGS. 4 and 7). Guide channel pieces 60 are preferably U-shaped in cross section having a channel 61 to receive rectangular side rails 24 therein. Many other cross-sectional shapes are also possible.

The relative position of trailer frame 20 is fixed by locking pins 64 which extend through mating sets of holes 65 and 66 in both sides of channel pieces 60 and side rails 24, respectively. A spring pin or other securement means 68 can be used to retain the locking pin in place. A plurality of holes 66 are provided in the side rails so that trailer frame 20 can be locked at two or more different positions.

The guide channel pieces 60 are advantageously provided with a polytetrafluorethylene or other antifriction pad etc attached thereto in the bottom of channel 61. Antifriction pad 63 allows the position of trailer frame 20 to be more easily changed.

The relative positions of trailer frame 20 are advantageously limited by stop members 68 which can be installed on the front and/or rear portions of frame 20 for engagement with the wheel carriage frame 15.

The dual load trailer 10 also preferably includes two jack means 70 which are removably mounted to the front portion of the trailer frame. Jacks 70 allow the trailer tongue to be easily raised and lowered for installation of the hitch 21 onto a hitch ball of a towing vehicle (not shown). Jacks 70 also aid in lowering the vehicle ramps 32 near the ground for loading the vehicle 96 as shown in FIG. 6.

The dual load trailer 10 is used in a variety of ways. It can be used to haul both a boat 97 and wheeled vehicle 96 as shown in FIG. 1. It can also be used to haul a boat or vehicle independently.

To load four wheel vehicle 96 onto trailer 10 it is necessary to first disconnect any towing vehicle (not shown) from hitch 21. Tongue 25 is then lowered onto the ground using jacks 70. The front portion of trailer 10 is shown in FIG. 6 with tongue 25 lowered onto the ground. Planks 85 and blocking 86 can then advantageously be used to provide a more convenient surface for the vehicle to drive onto ramps 32. Alternatively the vehicle can also be driven directly onto the ramps by using blocks or downturning the front edges 34 or by small ramps (not shown) which aid in driving onto ramps 32.

A boat such as boat 97 is loaded onto trailer 10 from rear end 23. To accomplish loading of boat 97 the rear support brackets 28 are removed from trailer frame 20. The trailer is then backed into a body of water (not shown) in a customary fashion. The boat is then aligned for movement into the trailer at rear end 23. Winch 52 is then connected to the bow of boat 97 and thereafter used to winch the boat from the water and up onto the front and rear roller assemblies 42 and 38 of hull supporting means 36. The bow of the boat is preferably winched tightly into the V-shaped bow support means 51. The rear support brackets 28 are then installed and secured to trailer frame 20 using locking pins 29.

Boat 97 can be launched with or without a wheeled vehicle in place on vehicle ramps 32. Launching boat 97 is easily accomplished by following a reverse sequence of the operations described above for loading the boat onto the trailer.

Trailer 10 can independently be loaded with the boat or motor vehicle. If the boat and wheeled vehicle are not being simultaneously carried then the weight distribution of the trailer load shifts either forward or backward. This shifting of the trailer load center of gravity causes the tongue weight applied through hitch 21 to vary beyond desirable limits. Accordingly, trailer 10 is provided with a trailer frame position adjustment means which allows the longitudinal relative position of trailer frame 20 to be adjusted with respect to wheel carriage 13. The structure of the trailer frame position adjustment means was described above. Its operation will now be more fully considered.

To adjust the position of the trailer frame it is first necessary to remove the four or more locking pins 64 from their engagement with the guide channels 60 and side rails 24. The trailer frame 20 is then slid relative to the wheel carriage 13 to align a new set of holes 66 with holes 65 in the guide channel. FIG. 4 shows in phantom a position wherein trailer frame 20 is shifted forwardly. The locking pins 64 are then reinserted and the securement means 68 used to prevent loss of the locking pins.

Relative movement between the trailer frame and wheel carriage can be accomplished in a variety of ways but is advantageously done by locking the trailer brakes (not shown) or blocking wheels 12 and then forcing the trailer frame using a towing vehicle (not shown) attached to hitch 21. The locking pins 64 are then installed to fix the relative position of the trailer frame upon wheel carriage 13.

The dual load trailer of this invention is preferably constructed in the form described using usual materials and methods of trailer fabrication. Steel is advantageously used for the various structural type components and rubber is used for rollers on the roller assemblies 38, 42 and at 30. Other details of construction will be obvious to one of ordinary skill in the art.

In compliance with the statue, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A dual load trailer for simultaneously carrying a boat and a wheeled motor vehicle, comprising:
   a plurality of wheel means rotatably mounted upon a wheel carriage for rolling motion over a supporting surface;
   a trailer frame having a front end and rear end, said trailer frame having a hitch means connected at the front end for attaching the trailer to a towing vehicle, said trailer frame further including at least two longitudinal side rails connected thereto in spaced relationship by a plurality of cross members, said longitudinal rails being approximately parallel over parallel portions thereof;
   trailer frame position adjustment means for adjustably connecting the trailer frame to the wheel carriage at various relative longitudinal positions to adjust loading of the trailer with respect to the wheel carriage;
   vehicle ramp means mounted upon the trailer frame for allowing a wheeled vehicle to be driven thereonto from the front end of the trailer frame; and
   an inclined hull supporting means connected to the trailer frame and extending upwardly over rearward portions of said vehicle ramp means and sloping downwardly toward the rear end of the trailer frame and having a plurality of roller assemblies connected thereto for supporting a boat hull thereon in an inclined position and for allowing the boat hull to be launched from the rear of the trailer frame.

2. The dual load trailer of claim 1 wherein said trailer frame position adjustment means comprises guide channels mounted upon said wheel carriage to adjustably receive said parallel portions of said side rails therein at various relative longitudinal positions; and means for detachably fixing the relative longitudinal positions of said side rails to saidguide channels.

3. The dual load trailer of claim 2 wherein the guide channels are U-shaped and open upwardly to receive the side rails therein.

4. The dual load trailer of claim 1 wherein the inclined hull supporting means extends up and over the vehicle ramp means for supporting a bow of the boat over the wheeled motor vehicle.

5. The dual load trailer of claim 1 further comprising rear support brackets detachably connected to the trailer frame and extending therefrom to contact a transom of the boat to prevent unwanted rearward motion of the boat.

6. The dual load trailer of claim 1 further comprising side jacks mounted forward of the wheel means for raising and lowering the front end of the trailer frame.

7. The dual load trailer of claim 4 wherein the inclined hull supporting means includes a plurality of roller assemblies extending rollers upwardly to engage and support the boat hull thereon.

8. The dual load trailer of claim 1 wherein the inclined hull supporting means includes:
   a transverse span member which extends up and over the vehicle ramp means for supporting a bow of the boat over the wheeled motor vehicle; and
   at least one lateral member connected to the transverse span member and extending rearwardly therefrom to connect with the trailer frame to support the transverse span member.

9. The dual load trailer of claim 8 wherein the span member is adjustably connected to the trailer frame and the lateral member, to allow adjustment of the trailer for varying boat and motor vehicle sizes.

* * * * *

UNITED STATES PATENT AND TRADEMARK OFFICE
CERTIFICATE OF CORRECTION

PATENT NO. : 4,560,316
DATED : December 24, 1985
INVENTOR(S) : Lewis D. Daniels

It is certified that error appears in the above—identified patent and that said Letters Patent are hereby corrected as shown below:

The correct address is E. 14 - 16th Avenue, Spokane, Washington 99203

*Signed and Sealed this*

*Twenty-fourth* Day of *June 1986*

[SEAL]

*Attest:*

DONALD J. QUIGG

*Attesting Officer*  *Commissioner of Patents and Trademarks*